(12) United States Patent
Maatta et al.

(10) Patent No.: US 10,972,590 B2
(45) Date of Patent: Apr. 6, 2021

(54) ELECTRIC SIGNAL TRANSMISSION LINE IN A COMMUNICATION DEVICE

(71) Applicants: Huawei Technologies Co., Ltd., Shenzhen (CN); Esa Maatta, Kista (SE)

(72) Inventors: Esa Maatta, Kista (SE); Jouni Tapio Mäki, Helsinki (FI); David Powney, Kista (SE); Mikko Kylkilahti, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/624,366

(22) PCT Filed: Jun. 28, 2017

(86) PCT No.: PCT/EP2017/066006
§ 371 (c)(1),
(2) Date: Dec. 19, 2019

(87) PCT Pub. No.: WO2019/001700
PCT Pub. Date: Jan. 3, 2019

(65) Prior Publication Data
US 2020/0374378 A1    Nov. 26, 2020

(51) Int. Cl.
*H04B 1/38*     (2015.01)
*H04M 1/02*    (2006.01)
(Continued)

(52) U.S. Cl.
CPC ............ *H04M 1/0262* (2013.01); *H01P 3/08* (2013.01); *H01R 12/7076* (2013.01)

(58) Field of Classification Search
CPC .......... H01Q 1/22; H01Q 1/241; H01Q 1/243; H01Q 1/50; H04B 1/38; H04B 1/3888
See application file for complete search history.

(56) References Cited

U.S. PATENT DOCUMENTS

2009/0312067 A1* 12/2009 Peng ...................... H01Q 1/243
455/572
2009/0312069 A1* 12/2009 Peng ...................... H01Q 1/243
455/572
(Continued)

FOREIGN PATENT DOCUMENTS

| CN | 103986804 A | 8/2014 |
|---|---|---|
| KR | 20120101957 A | 9/2012 |
| KR | 101305518 B1 | 9/2013 |

*Primary Examiner* — Blane J Jackson
(74) *Attorney, Agent, or Firm* — Conley Rose, P.C.

(57) ABSTRACT

A method for assembling a communication device and the communication device The communication device includes a casing that houses a battery. The battery extends in a main extension plane. The casing includes a back cover to cover the battery, and the back cover extends in a second plane substantially parallel to the main extension plane. The communication device also has an electrical signal transmission line having a first portion and a second portion. The second portion is coupled to a processor of the communication device. The first portion has a longitudinal extension coupled to at least one electrical component, wherein the first portion extends alongside the battery in a third plane substantially perpendicular to the main extension plane.

20 Claims, 11 Drawing Sheets

(51) Int. Cl.
*H01Q 1/22* (2006.01)
*H01P 3/08* (2006.01)
*H01R 12/70* (2011.01)

(56) References Cited

U.S. PATENT DOCUMENTS

2012/0231855 A1    9/2012  Choi et al.
2013/0017867 A1    1/2013  Lee et al.
2013/0207854 A1    8/2013  Ryu
2014/0225806 A1*   8/2014  Lee .................. H01Q 1/243
                                                   343/905

* cited by examiner

ELECTRIC SIGNAL TRANSMISSION LINE IN A COMMUNICATION DEVICE

CROSS-REFERENCE TO RELATED APPLICATIONS

This application is a U.S. National Stage of International Patent Application No. PCT/EP2017/066006, filed on Jun. 28, 2017, which is hereby incorporated by reference in its entirety.

TECHNICAL FIELD

Aspects of the present invention relate to a communication device comprising a casing which houses a battery. Aspects of the present invention also relate to a method for assembling a communication device.

BACKGROUND

In general, a communication device, e.g. a cellular phone, is provided with a battery to supply energy to the functions and units requiring it. Access to the battery is often provided by removing a back cover.

SUMMARY

The inventors of the present invention have identified problems and drawbacks associated with the cellular phone battery. For example, resonances, also called lossy resonances, originate from the battery and affect neighbouring components, and the result is impaired performance of the cellular phone and its components. Neighbouring components, due to their positions in relation to the battery, may also contribute to an increase of the thickness of the cellular phone.

An object of the embodiments of the invention is thus to provide an improvement of the performance of the cellular phone.

Another object is to provide a cellular phone with a reduced thickness.

According to a first aspect of the invention, the above-mentioned objects of the present invention are attained by providing a communication device comprising a casing. The casing houses a battery extending in a main extension plane. The casing comprises a back cover which is configured to cover the battery, the back cover extending in a second plane substantially parallel to the main extension plane. The communication device comprises an electrical signal transmission line which comprises a first portion and a second portion. The second portion is connected to a processing unit of the communication device, wherein the first portion along its longitudinal extension is connected to at least one electrical component. The first portion extends alongside the battery, and the first portion extends in a third plane substantially perpendicular to the main extension plane. The electrical signal transmission line may be a planar transmission line.

The main extension plane is the plane in which the battery has its largest area. Typically the battery (and the communication device) extends in two further planes mutually orthogonal and orthogonal to the main extension plane which however have a smaller area than the main extension plane. The main extension plane is typically parallel to the screen and back of the communication device (assuming a flat back cover and a flat screen).

By placing the first portion of electrical signal transmission line alongside the battery, the electrical signal transmission line is less affected by the resonances originating from the battery. Further, the grounding of the first portion of the electrical signal transmission line is facilitated by the inventive position of the first portion of the electrical signal transmission line compared to a position on top of the battery. By the inventive position of the electrical signal transmission line, the performance of the communication device is improved. Further, by the inventive position of the first portion of the electrical signal transmission line the thickness of the communication device can be reduced.

In an implementation form of a communication device according to the first aspect, the first portion of the electrical signal transmission line is connected to each of the at least one electrical component by a respective resilient contact. The resilient contact is attached and connected to the first portion of the electrical signal transmission line. Each electrical component has a contact portion, and the resilient contact resiliently abuts against the contact portion of the electrical component. An advantage with this implementation form is that the connection of the electrical component to the electrical signal transmission line is facilitated. Further, the disconnection of the electrical component, if needed, is also facilitated.

In a further implementation form of a communication device according to the first aspect, the communication device comprises a plurality of resilient contacts each connecting one of the at least one electrical component to the first portion of the electrical signal transmission line. An advantage with this implementation form is that the connection of one or more electrical components to the electrical signal transmission line is facilitated. One resilient contact may connect one electrical component, or a plurality of resilient contacts may connect one and the same electrical component.

In another implementation form of a communication device according to the first aspect, the at least one electrical component comprises a plurality of electrical components, whereby the first portion along its longitudinal extension is connected to the plurality of electrical components. An advantage with this implementation form is that the connection of a plurality of electrical components is improved, and the electrical components and the electrical signal transmission line are subjected to less lossy resonance from the battery. Hereby, the performance of the communication device is further improved.

In yet another implementation form of a communication device according to the first aspect, each resilient contact comprises a first contact portion and a second contact portion. The first contact portion comprises a resilient member which resiliently abuts against the contact portion of the electrical component. The second contact portion is attached to and connected to the first portion of the electrical signal transmission line, wherein the second contact portion extends in a fourth plane substantially parallel to the third plane. An advantage with this implementation form is that the connection of the electrical component to the electrical signal transmission line is further improved and facilitated, and the contact is less affected by the lossy resonance from the battery. Hereby, the performance of the communication device is further improved.

In still another implementation form of a communication device according to the first aspect, the casing comprises a front which is opposite the back cover and extends in a fifth plane substantially parallel to the main extension plane. The casing comprises a surrounding frame which mounts the back cover to the front. The battery is situated inside the frame and between the front and the back cover. The first portion of the electrical signal transmission line is configured to be placed between the battery and the frame. An advantage with this implementation form is that the electrical signal transmission line is less affected by the resonance originating from the battery, and the performance of the electrical signal transmission line and the communication device is improved.

In an implementation form of a communication device according to the first aspect, a longitudinal stiffener is attached to the first portion of the electrical signal transmission line. The stiffener extends alongside the first portion of the electrical signal transmission line in a sixth plane substantially parallel to the third plane. An advantage with this implementation form is that the electrical signal transmission line is made more robust and the connection of the at least one electrical component is further improved. Hereby, the performance of the communication device is further improved.

In a further implementation form of a communication device according to the first aspect, the casing comprises an inner wall situated between the battery and the frame. The inner wall extends alongside the battery in a seventh plane substantially perpendicular to the main extension plane. The combination of the first portion of the electrical signal transmission line and the stiffener is fastened to the inner wall by means of at least one fastener, e.g. a plurality of fasteners. Each fastener may be a clip. An advantage with this implementation form is that the first portion of the electrical signal transmission line is firmly attached to the frame of the communication device. Hereby, the performance of the communication device is further improved.

In another implementation form of a communication device according to the first aspect, the inner wall and the fastener are electrically conductive, wherein the first portion of the electrical signal transmission line is grounded by the fastener. An advantage with this implementation form is that an efficient grounding of the first portion of the electrical signal transmission line is attained. Hereby, the performance of the communication device is further improved.

In yet another implementation form of a communication device according to the first aspect, the stiffener is electrically conductive, and the first portion of the electrical signal transmission line is grounded by the stiffener. An advantage with this implementation form is that an efficient grounding of the first portion of the electrical signal transmission line is attained. Hereby, the performance of the communication device is further improved.

In still another implementation form of a communication device according to the first aspect, the electrical signal transmission line comprises a stripline. The stripline may be configured to operate in the Radio Frequency, RF, range. The stripline may be in form of a so-called RF (Radio Frequency) flexi. An advantage with this implementation form is that the stripline is suitable to be arranged as disclosed above for the electrical signal transmission line. An advantage with this implementation form is that the electrical signal transmission line is made more robust and the connection of the at least one electrical component is further improved. Hereby, the performance of the communication device is further improved. An alternative to the stripline may be a microstrip, suspended stripline, coplanar waveguide, or slotline.

In an implementation form of a communication device according to the first aspect, the second portion of the electrical signal transmission line is bent in relation to the first portion of the electrical signal transmission line in order to be connected to the processing unit of the communication device. An advantage with this implementation form is that the electrical signal transmission line is made more robust and the connection of the at least one electrical component is further improved. Hereby, the performance of the communication device is further improved.

In a further implementation form of a communication device according to the first aspect, the second portion of the electrical signal transmission line extends in an eighth plane substantially parallel to the main extension plane. An advantage with this implementation form is that the thickness of the communication device is kept at a minimum.

In another implementation form of a communication device according to the first aspect, each of the at least one electrical component is an antenna radiating element. Thus, according to this implementation form, the resilient contact resiliently abuts against the contact portion of the antenna radiating element in a resilient manner. When the at least one electrical component is an antenna radiating element, the processing unit may suitably be a transmitter-and-receiver unit, e.g. a transceiver. By means of this implementation form, the resonance of the battery has a reduced influence on the antenna radiating element/-s, and consequently, the performance of the communication device is further improved.

In yet another implementation form of a communication device according to the first aspect, each antenna radiating element is attached to the back cover. Each antenna radiating element may be attached to the back cover by plating, printing, chemical etching etc. The respective antenna element may be attached to the inside surface of the back cover or to the outside surface of the back cover. Each antenna radiating element may be attached to the back cover by being moulded into the back cover. An advantage with this implementation form is that each antenna radiating element is spaced apart from the battery as well as other metallic parts of the communication device in an efficient way, and that the resonance of the battery or any other electrically conductive components and parts has a reduced influence on the antenna radiating elements. Further, when being attached to the back cover, the connection of the antenna radiating elements to the electrical signal transmission line is effected in an efficient way simply by mounting the back cover to the frame of the communication device.

According to a second aspect of the invention, the above-mentioned objects of the present invention are attained by providing a method for assembling a communication device comprising a casing having a back cover, a front and a surrounding frame. The frame is configured to mount the back cover to the front, and at least one electrical component is attached to the back cover. The method comprises the steps of:

placing a battery inside the frame;
placing a first portion of an electrical signal transmission line alongside the battery between the battery and the frame;
connecting a second portion of the electrical signal transmission line to a processing unit of the communication device; and
connecting the first portion of the electrical signal transmission line to each of the at least one electrical component, wherein the step of connecting the first portion of the electrical signal transmission line to each of the at least one electrical component is effected by attaching the back cover to the frame.

By this method, the communication device is efficiently and securely assembled, especially when the at least one electrical component is attached to the back cover. By this method, a good performance of the communication device is assured.

The additional step of placing a processing unit inside the frame may be added, e.g. between the step of placing a battery inside the frame and the step of placing a first portion of an electrical signal transmission line alongside the battery.

By "connected" is meant that two connected units can be electrically connected directly to one another, e.g. via an electrically conductive path, or indirectly connected/coupled to one another through some electrical means, for example a transformer or capacitor. By "substantially" in the context of "substantially parallel" is meant that the plane in question is essentially parallel to another plane, but that there may be a deviation or difference of a few degrees. By "substantially" in the context of "substantially perpendicular" is meant that the plane in question is essentially perpendicular to another plane, but that there may be a deviation or difference of a few degrees (e.g. at maximum ±10, ±5, or ±2 degrees) from the right angle (90 degrees).

The above-mentioned features and embodiments, respectively, may be combined in various possible ways providing further advantageous embodiments. Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

The communication device 102 herein disclosed may be denoted as a user device, a User Equipment (UE), a mobile station, an internet of things (IoT) device, a sensor device, a wireless terminal and/or a mobile terminal, enabled to communicate wirelessly in a wireless communication system, sometimes also referred to as a cellular radio system. The UEs may further be referred to as mobile telephones or cellular telephones with wireless capability. The UEs in the present context are for example portable, pocket-storable, hand-held, computer-comprised enabled to communicate voice and/or data, via the radio access network, with another entity, such as another receiver or a server.

Figure 1:
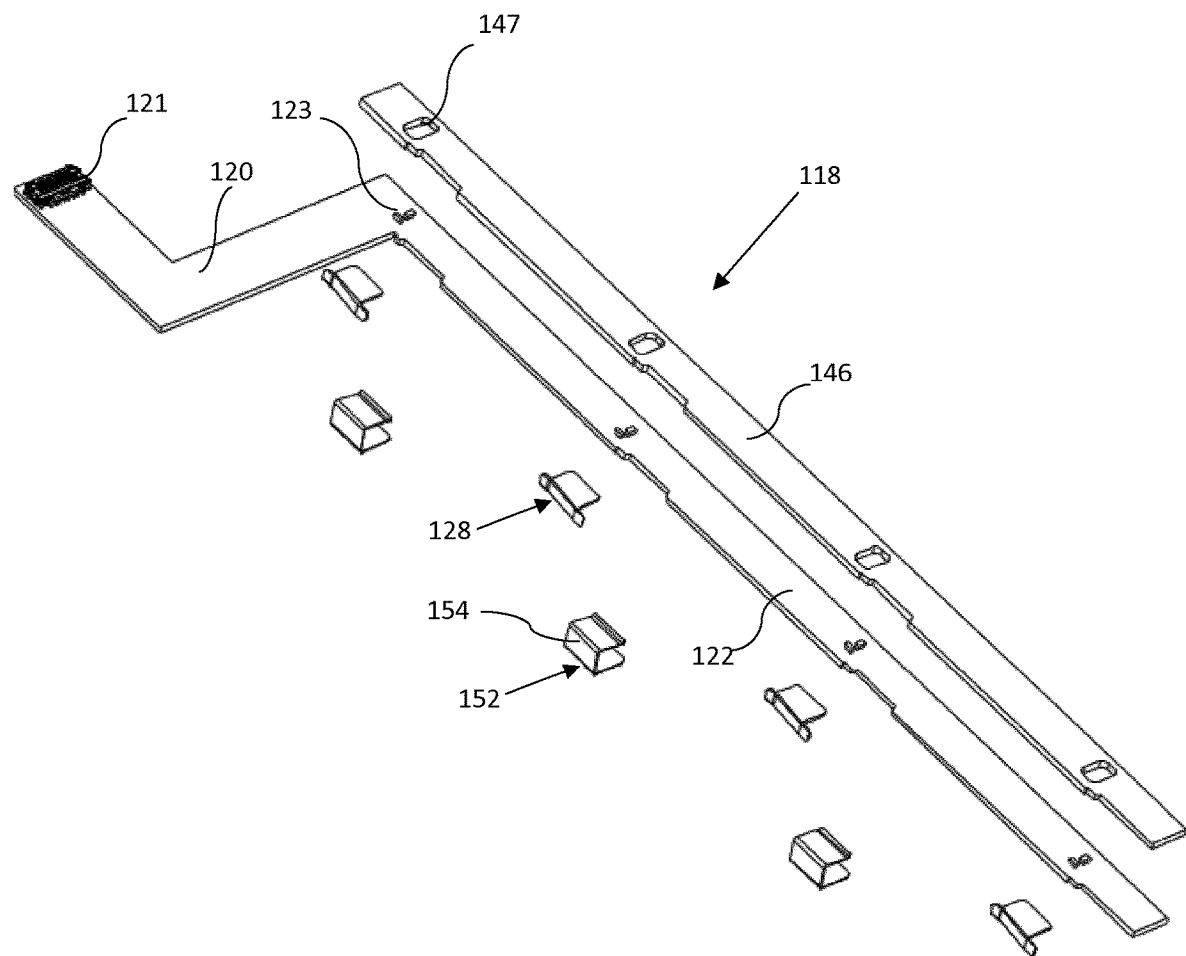
FIG. 1 is a schematic exploded view of an electrical signal transmission line of an embodiment of the communication device according to the present invention.

With reference to FIG. 1, an electrical signal transmission line 118, which is part of or included in a communication device 102 (as shown starting with FIG. 4), is shown in an exploded view. The electrical signal transmission line 118 comprises a first portion 122 and a second portion 120. The second portion 120 is provided with a connector 121, e.g. a board-to-board RF connector, configured to be connected to a processing unit 124 (see FIG. 4) of the communication device 102. The first portion 122 is provided with a plurality of matching components 123 for tuning one or a plurality of electrical components 116 e.g. in the form of antenna radiating elements 117. In the example of FIG. 1, four matching components 123 are provided. Further, the first portion 122 is provided with a plurality, e.g. four as shown in FIG. 1, resilient contacts 128 attached and connected to the first portion 122. A longitudinal stiffener 146 can be attached to the first portion 122 of the electrical signal transmission line 118 and extends alongside the first portion 122. The stiffener 146 may be glued to the first portion 122. Further, the stiffener 146 is provided with openings 147 configured to receive the matching components 123. FIG. 1 also shows a plurality of fasteners 152. In this embodiment each fastener 152 is in the form of a clip 154. The fasteners 152 will be discussed in more detail in connection with other Figures hereinbelow.

Figure 2:
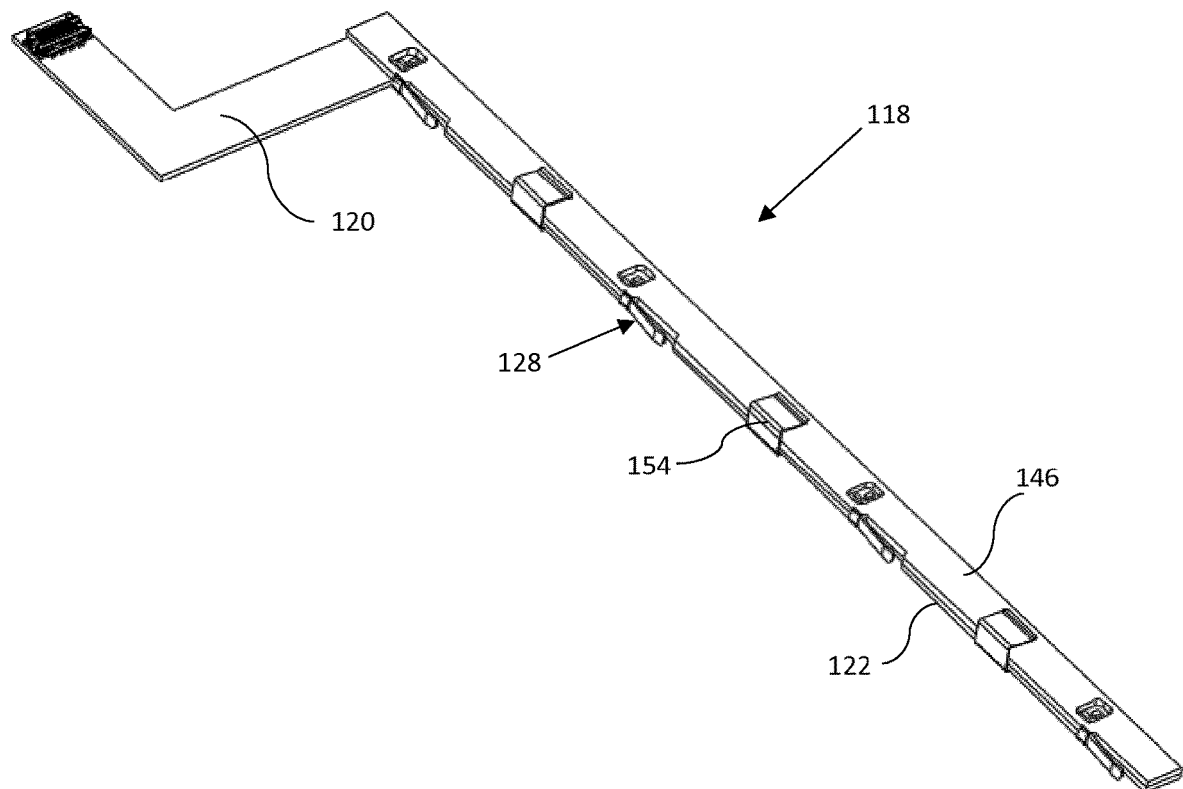
FIG. 2 is a schematic perspective view of the electrical signal transmission line of FIG. 1.

In FIG. 2, the stiffener 146 has been attached, e.g. by glue, to the first portion 122 of the electrical signal transmission line 118, and the matching components 123 have been received by the openings 147. The resilient contacts 128 have also been attached to the first portion 122.

Figure 3:
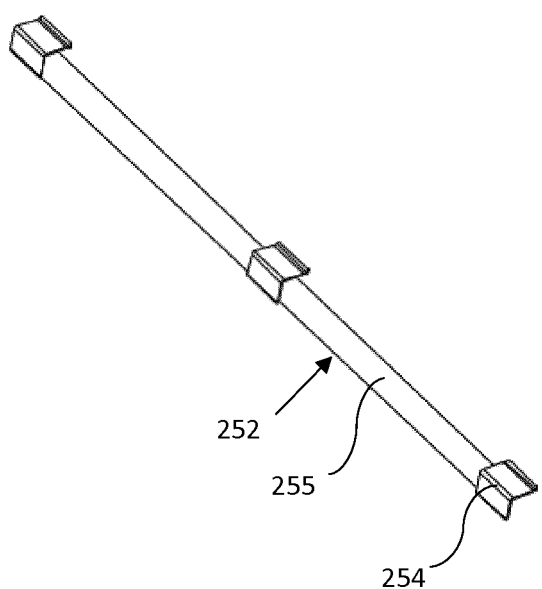
FIG. 3 is a schematic perspective view of an alternative to the fasteners in FIGS. 1-2.

In FIG. 3, an alternative to the fasteners 152 of FIGS. 1-2 is illustrated. Instead of three separate fasteners 152, one single fastener 252 is provided. The fastener 252 comprises three clips 254 which are attached to one another by intermediate members 255.

Figure 4:
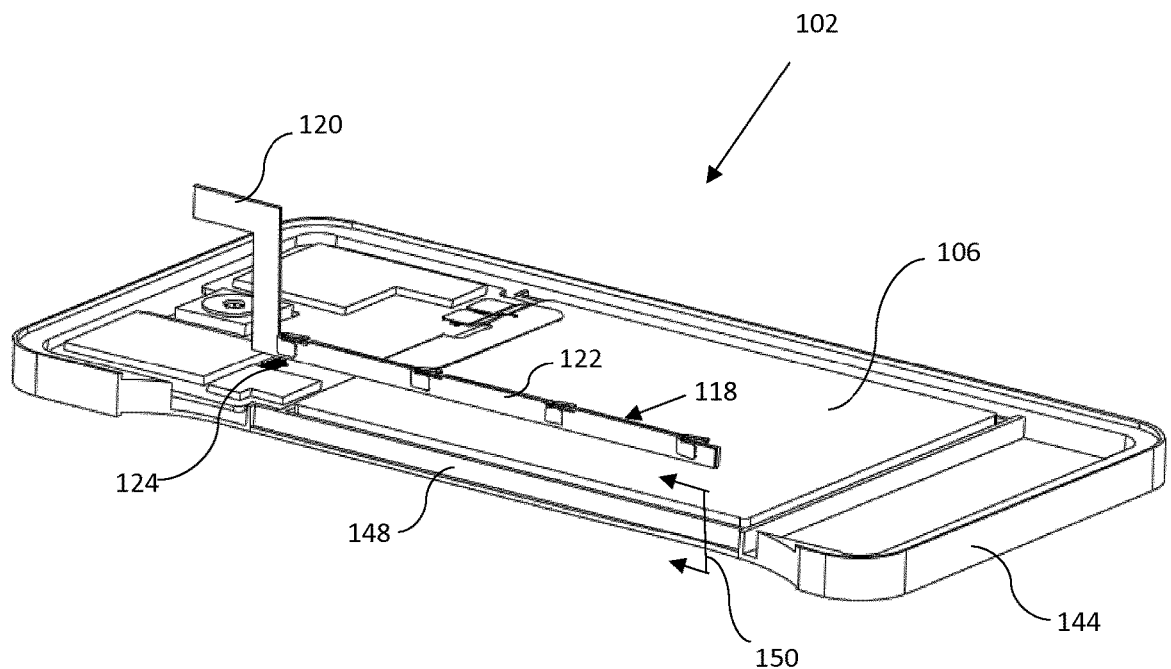
FIG. 4 is a schematic perspective view of an embodiment of the communication device according to the present invention.

FIG. 4 illustrates how the first portion 122 of the electrical signal transmission line 118 is about to be inserted in its final position in the communication device 102. The processing unit 124 of the communication device 102, to which the connector 121 of the second portion 120 of the electrical signal transmission line 118 is to be attached, is shown. The processing unit 124 may be a transmitter-and-receiver unit, e.g. a transceiver for RF signals. This of course depends on the electrical component(s) to be connected to the electrical signal transmission line 118. E.g. if an electrical component to be connected to the electrical signal transmission line is a speaker or a microphone the processing unit 124 could also be an audio processing unit. FIG. 4 also illustrates the surrounding frame 144 and the battery 106 of the communication device 102.

Figure 5:
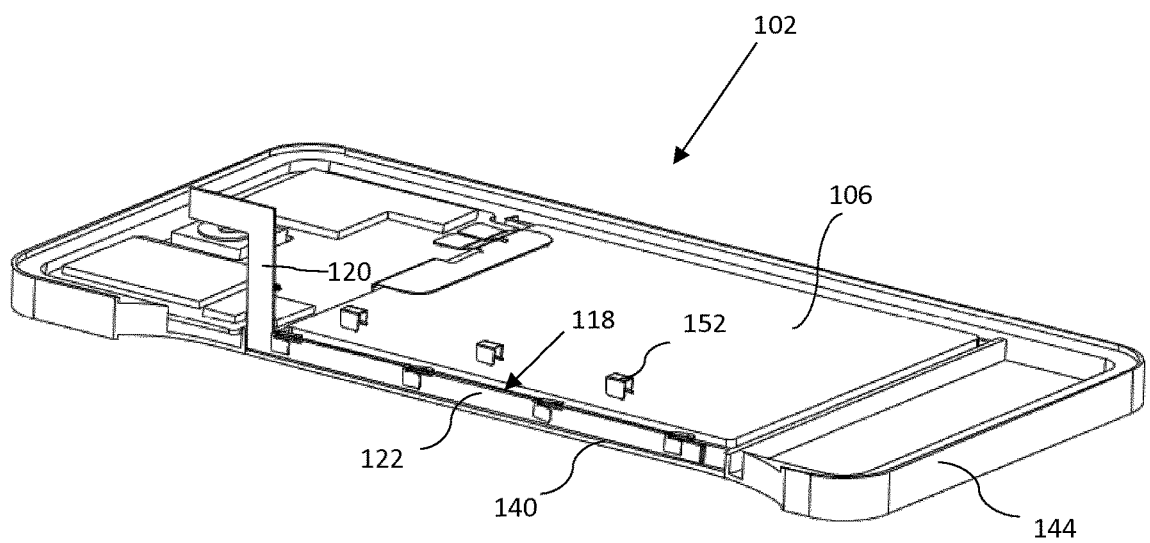
FIG. 5 is a schematic perspective view of the embodiment of FIG. 4.

With reference to FIG. 5, the electrical signal transmission line 118 is yet closer to its final assembled position as at least the first portion 122 is now already in its final position in the surrounding frame 144.

Figure 6:
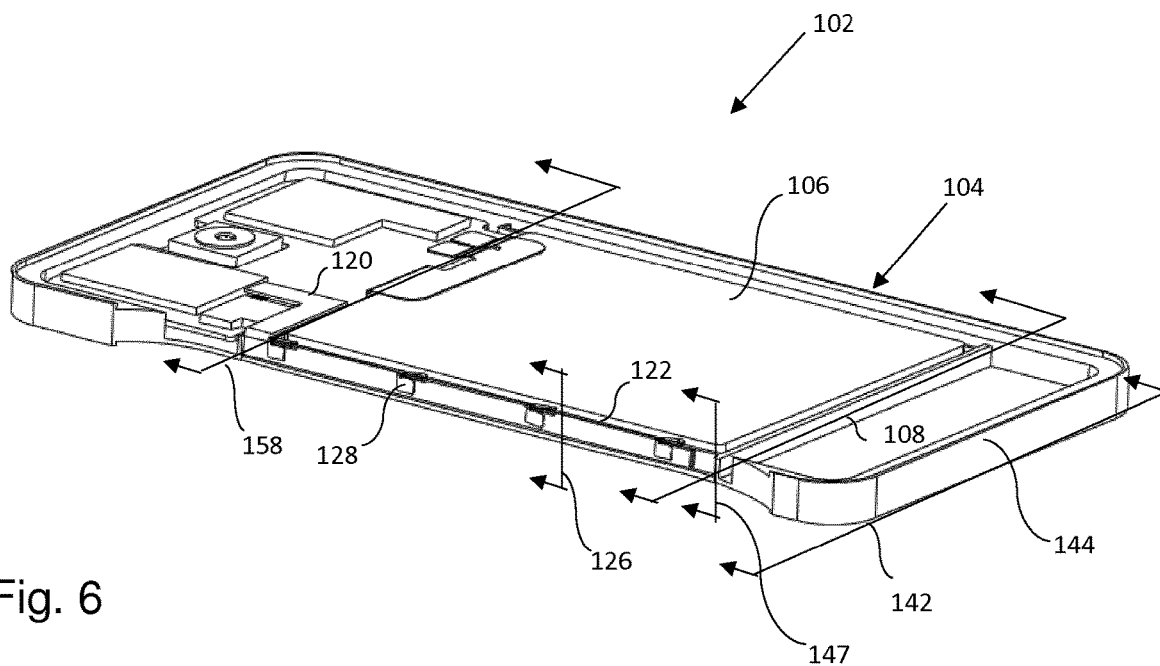
FIG. 6 is a schematic perspective view of the embodiment of FIG. 4.
Figure 7:
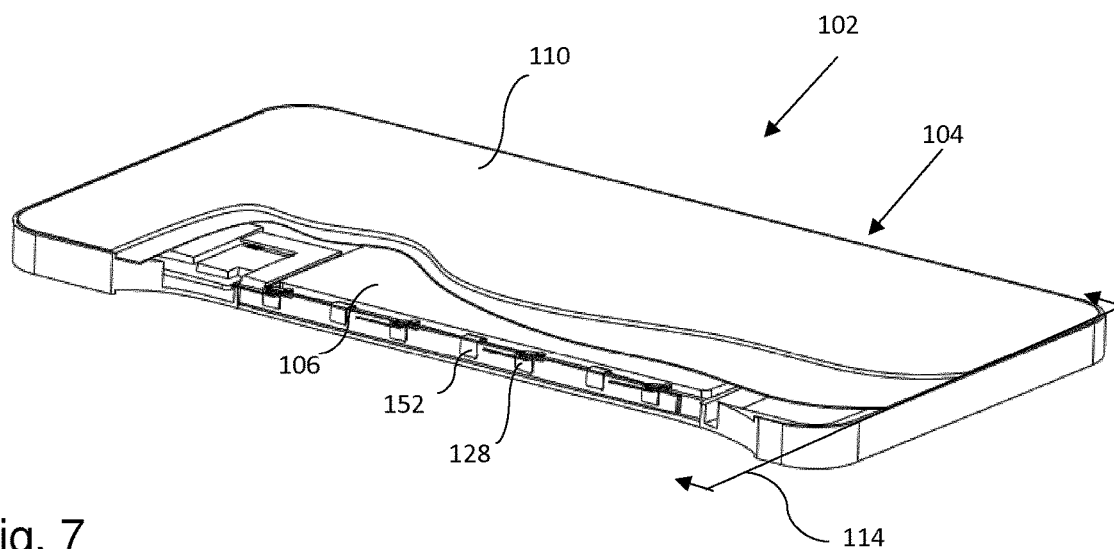
FIG. 7 is a schematic cut-away view of an embodiment of the communication device according to the present invention.

With reference to FIGS. 6-7, the entire communication device 102 is illustrated. However, in FIG. 6 the back cover 110 is not present. The communication device 102 includes a casing 104 which houses the battery 106. The battery 106 extends in a main extension plane 108. The casing 104 comprises a back cover 110 which is configured to cover the battery 106. The back cover 110 extends in a second plane 114 substantially parallel to the main extension plane 108. Opening the back cover 110 provides access to essentially the entire battery 106.

As disclosed above, the communication device 102 further includes the electrical signal transmission line 118 comprising the first portion 122 and the second portion 120. As shown in FIG. 6, the second portion 120 is connected to the processing unit 124. The first portion 122 extends alongside the battery 106 in a third plane 126 substantially perpendicular to the main extension plane 108. The second portion 120 of the electrical signal transmission line 118 extends in an eighth plane 158 substantially parallel to the main extension plane 108. The second portion 120 of the electrical signal transmission line 118 is bent in relation to the first portion 122 of the electrical signal transmission line 118 in order to be connected to the processing unit 124.

With reference to FIGS. 6-7, the casing 104 comprises a front 140 (see FIG. 11) which is opposite the back cover 110 and extends in a fifth plane 142 (see FIG. 6) substantially parallel to the main extension plane 108. The casing 104 comprises a surrounding frame 144 which mounts the back cover 110 to the front 140. The battery 106 is located inside the frame 144 and between the front 140 and the back cover 110. The first portion 122 of the electrical signal transmission line 118 is configured to be placed between the battery 106 and the frame 144. The casing 104 also includes an inner wall 148 (see FIGS. 4 and 12) which is situated between the battery 106 and the frame 144. The inner wall 148 extends alongside the battery 106 in a seventh plane 150 substantially perpendicular to the main extension plane 108 (see FIGS. 4 and 12). The stiffener 146 is attached to the first portion 122 of the electrical signal transmission line 118 and extends alongside the first portion 122 of the electrical signal transmission line 118 in a sixth plane 147 (see FIGS. 6 and 12) substantially parallel to the third plane 126. With reference to FIG. 7, the combination of the first portion 122 of the electrical signal transmission line 118 and the stiffener 146 is fastened to the inner wall 148 by means of the at least one fastener 152, e.g. a plurality of fasteners 152, such as three fasteners 152 as shown in FIG. 7. In the present example, the inner wall 148 and the fasteners 152 are electrically conductive, wherein the first portion 122 of the electrical signal transmission line 118 is grounded by the fastener 152 and the inner wall 148 (for further details see FIG. 9 and associated text). Alternatively, the stiffener could be electrically conductive, and the first portion 122 of the electrical signal transmission line 118 would then be grounded by the stiffener.

Figure 8:
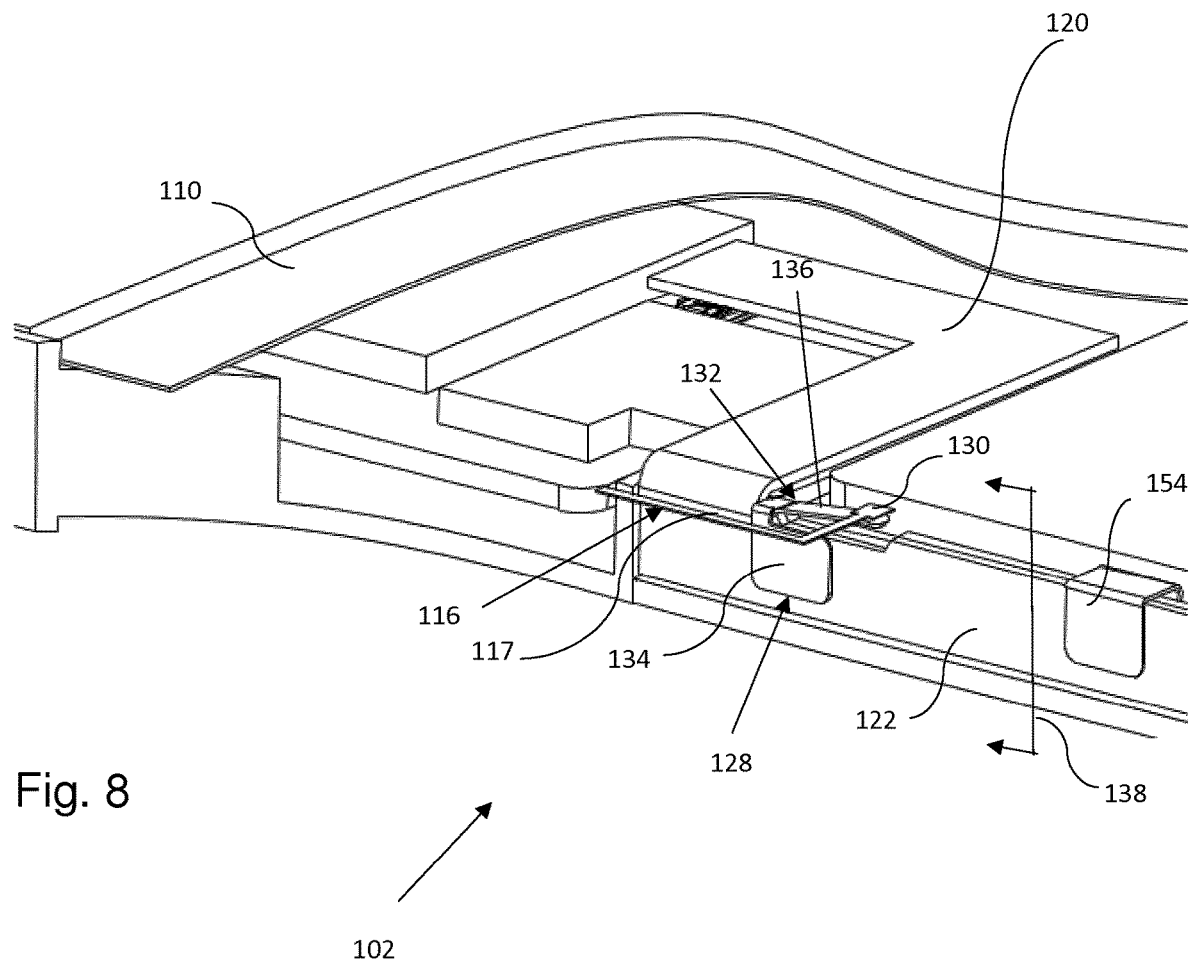
FIG. 8 is an enlargement of a portion of the embodiment of FIG. 7.

As illustrated in FIGS. 7-8, where part of the back cover is cut away for illustrative purposes, the first portion 122 along its longitudinal extension is connected to a plurality of electrical components 116. The first portion 122 along its longitudinal extension is provided with a plurality of resilient contacts 128. The electrical signal transmission line 118 is connected to each of the plurality of electrical components 116 by a respective resilient contact 128 which is attached and connected to the first portion 122 of the electrical signal transmission line 118. Each electrical component 116 has a contact portion 130. The resilient contact 128 resiliently abuts against the contact portion 130 of the electrical component 116. In the present embodiment, four resilient contacts 128 are present and accordingly also four electrical components 116 are present. Each electrical component is in the form of an antenna radiating element 117. In FIG. 8, only one antenna radiating element 117 is shown. With reference to FIG. 8, each resilient contact 128 comprises a first contact portion 132 and a second contact portion 134. The first contact portion 132 includes a resilient member 136, e.g. in the form of a tongue, which resiliently abuts against the contact portion 130 of the electrical component 116. The second contact portion 134, which may be in the form of a flap, is attached to and connected to the first portion 122 of the electrical signal transmission line 118. The second contact portion 134 extends in a fourth plane 138 substantially parallel to the third plane 126.

Figure 9:
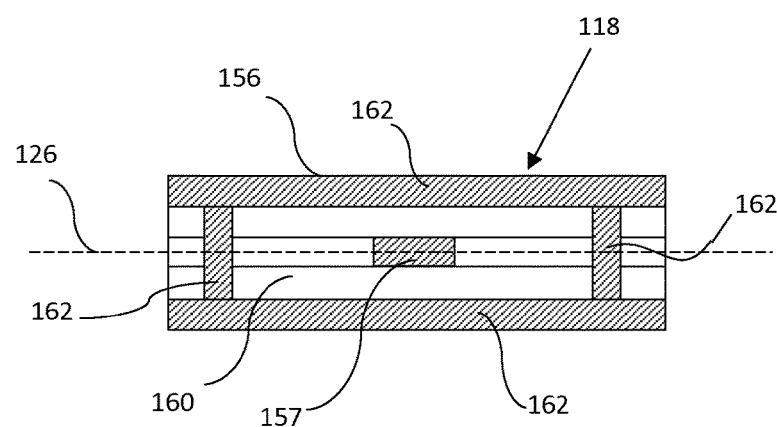
FIG. 9 is a schematic cross-section view of an electrical signal transmission line of an embodiment of the communication device according to the present invention.

With reference to FIG. 9, the electrical signal transmission line 118 may be a planar transmission line, e.g. a stripline 156. More precisely, the stripline 156 may be an RF flexi. The stripline 156 comprises a central conductor 157, e.g. made of copper, or any suitable electrically conductive metal or material. The central conductor 157 is surrounded by a dielectric material 160, and the dielectric material 160 is surrounded by four grounded layers 162, which may be made of copper, or any suitable electrically conductive metal or material. When the first portion 122 of the electrical signal transmission line 118 is grounded by the electrically conductive fasteners 152 and the inner wall 148, all of the four grounded layers 162 are grounded via the fasteners 152, i.e. there is a grounding path through the stripline structure. If the four grounded layers 162 instead are grounded by an electrically conductive stiffener, in a corresponding way there is a grounding path through the stripline structure to the stiffener.

Figure 10:
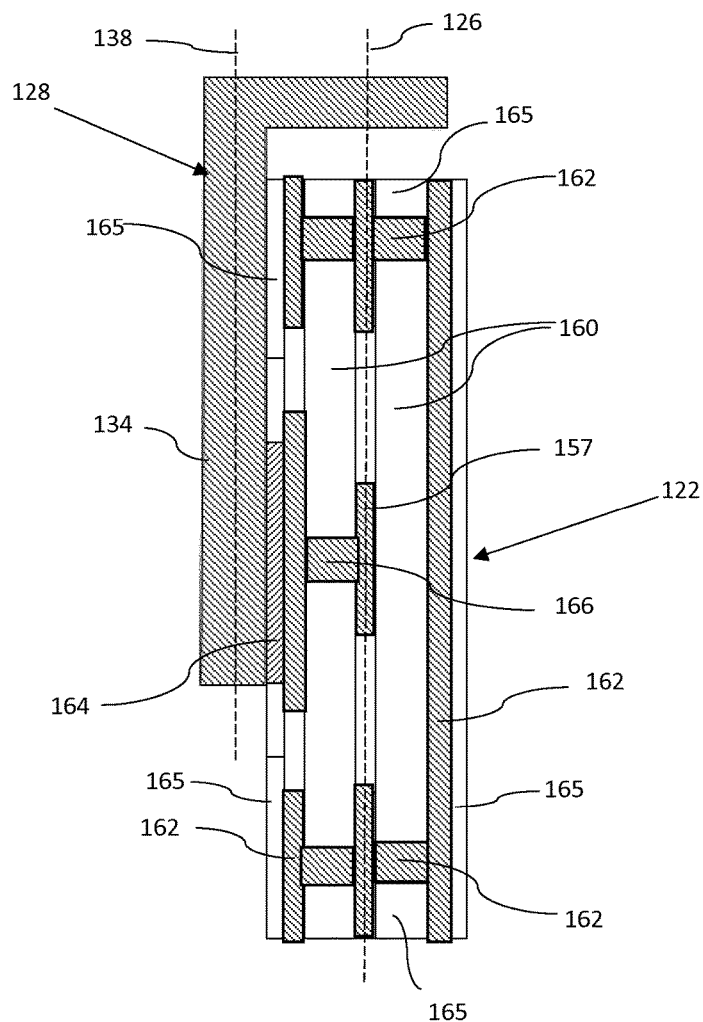
FIG. 10 is a schematic cross-section view of an electrical signal transmission line of an embodiment of the communication device according to the present invention.

With reference to FIG. 10, the connection of the resilient contact 128 to the first portion 122 of the electrical signal transmission line 118 is schematically illustrated. A central conductor 157 is surrounded by a dielectric material 160, and the dielectric material 160 is surrounded by four grounded layers 162. The central conductor 157 and the grounded layers 162 may be made of copper, or any suitable electrically conductive material. The second contact portion 134 of the resilient contact 128 is attached and connected to the first portion 122 of the electrical signal transmission line 118 by means of an electrically conductive solder 164. The second contact portion 134 of the resilient contact 128 is electrically connected to the central conductor 157 via an electrically conductive member 166 and via the solder 164. Thus, an electrically conductive path is provided between the second contact portion 134 and the central conductor 157. The member 166 may be made of copper or any suitable electrically conductive material. In addition, dielectric layers 165 are provided outside the grounded layers 162 except for where the solder 164 attaches the second contact portion 134 to the first portion 122 of the electrical signal transmission line 118. In FIG. 10, the third plane 126 of the first portion 122 is shown. Further, it is illustrated that the second contact portion 134 extends in a fourth plane 138 substantially parallel to the third plane 126.

Figure 11:
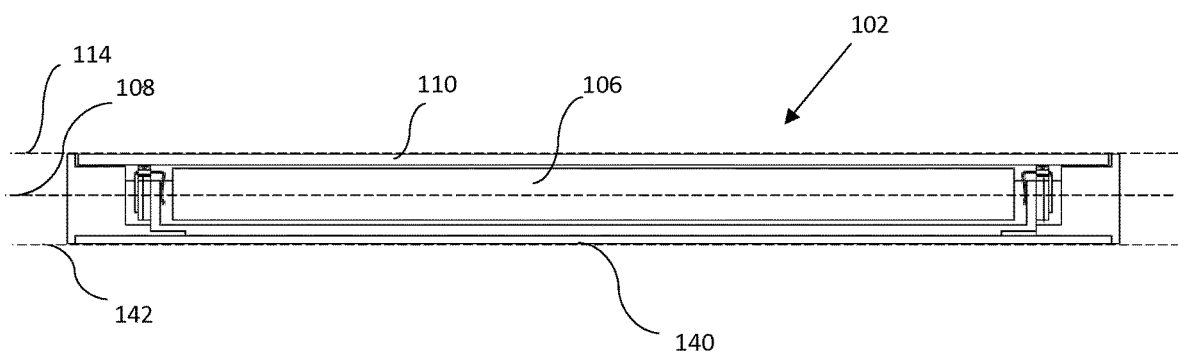
FIG. 11 is a cross-section view of the embodiment of FIG. 7.

With reference to FIG. 11, which is a cross-section view of the communication device 102 disclosed above, some of the planes are further illustrated. The battery 106 of communication device 102 is shown, and the battery 106 extends in the main extension plane 108. The back cover 110, which is configured to cover the battery 106, extends in the second plane 114 substantially parallel to the main extension plane 108. The front 140 of the casing 104, which is opposite the back cover 110, extends in the fifth plane 142 substantially parallel to the main extension plane 108.

Figure 12:
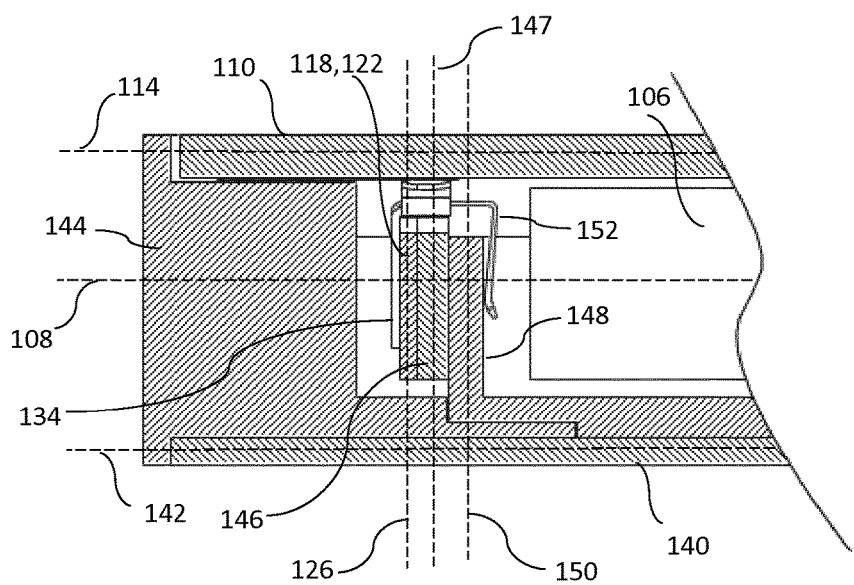
FIG. 12 is an enlargement of a portion of the cross-section view of FIG. 11.

With reference to FIG. 12, which is an enlargement of the cross-section view of the communication device disclosed above FIG. 11, some of the planes are further illustrated. As mentioned above, the battery 106 extends in the main extension plane 108. The back cover 110 extends in the second plane 114 which is substantially parallel to the main extension plane 108. The front 140 extends in the fifth plane 142 which is substantially parallel to the main extension plane 108. The first portion 122 of the electrical signal transmission line 118 extends alongside the battery 106 in the third plane 126 substantially perpendicular to the main extension plane 108. The stiffener 146 extends alongside the first portion 122 of the electrical signal transmission line 118 in the sixth plane 147 substantially parallel to the third plane 126. The inner wall 148, which is situated between the battery 106 and the frame 144, extends alongside the battery 106 in the seventh plane 150 which is substantially perpendicular to the main extension plane 108. In addition, FIG. 12 also discloses the fastener 152 which attaches the electrical signal transmission line 118 and the stiffener 146 to the inner wall 148

Figure 13:
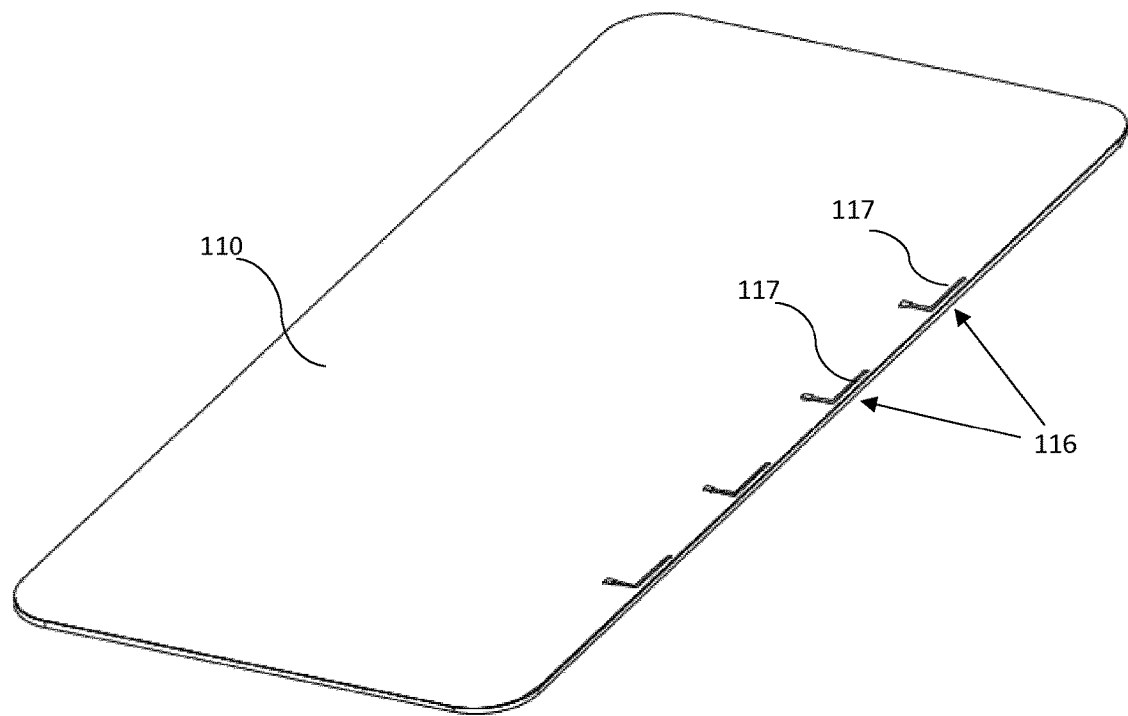
FIG. 13 is a schematic perspective view of the back cover of an embodiment of the communication device according to the present invention.
Figure 14:
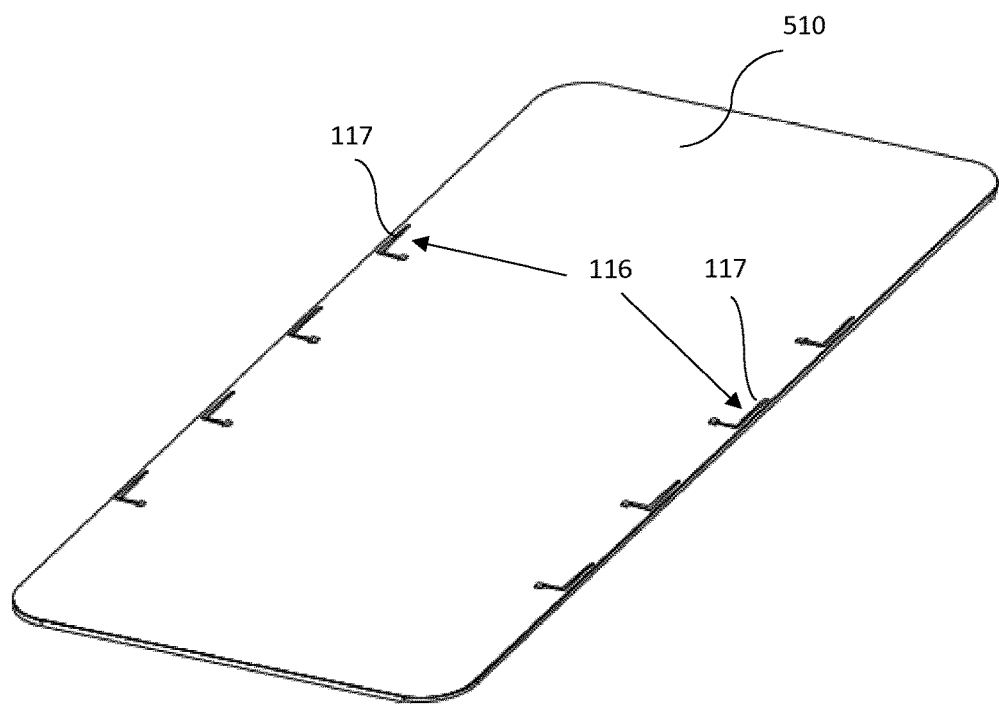
FIG. 14 is a schematic perspective view of the back cover of another embodiment of the communication device according to the present invention.
Figure 15:
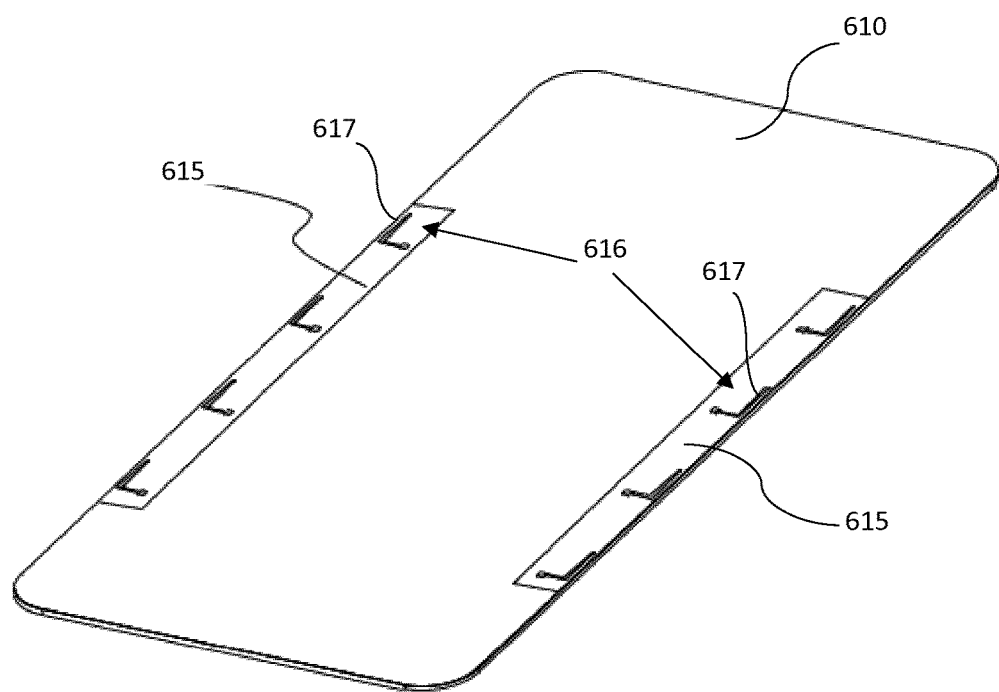
FIG. 15 is a schematic perspective view of the back cover of yet another embodiment of the communication device according to the present invention.

With reference to FIGS. 13-15, the back covers of embodiments of the communication device 102 according to the present invention are illustrated, wherein each of the at least one electrical component 116; 616 is an antenna radiating element 117; 617 and wherein each antenna radiating element 117; 617 is attached to the back cover 110; 610.

In FIG. 13, four antenna radiating elements 117 are shown, each connected to the first portion 122 of the electrical signal transmission line 118 via a resilient contact 128. The back cover 110, e.g. the inside surface of the back cover 110, is provided with a decoration foil, or decoration layer, with a printed antenna pattern. The pattern is printed with an electrically conductive ink on the decoration foil.

In FIG. 14, eight antenna radiating elements 117 are provided by being printed on decorated glass of the back cover 510. The eight antenna radiating elements 117 may be provided on the inside of the back cover 510. Each antenna radiating element 117 of the eight antenna radiating elements 117 is connected to a first portion 122 of an electrical signal transmission line 118 via a resilient contact 128. For the arrangement in FIG. 14, two electrical signal transmission lines 118 would be installed in the communication device 102.

In FIG. 15, eight electrical components 616 in the form of FPC, Flexible Printed Circuit, antenna radiating elements 617 are attached to the back cover 610 by being glued to a decorated glass 615 of the back cover 610, e.g. on the inside of the back cover 610. As in FIG. 14, two electrical signal transmission lines 118 would be installed in the communication device 102. Each antenna radiating element 617 of the eight antenna radiating elements 617 is connected to a first portion 122 of an electrical signal transmission line 118 via a resilient contact 128.

Figure 16:
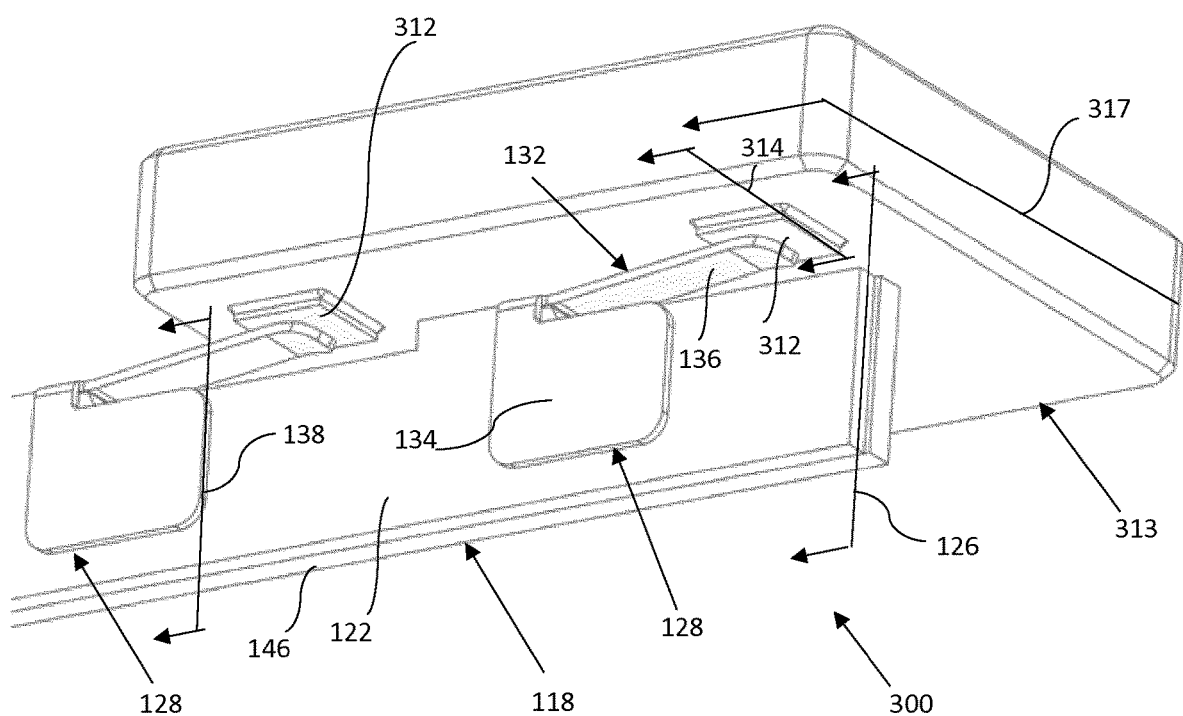
FIG. 16 is a schematic partial perspective view of an embodiment of the communication device according to the present invention.
Figure 17:
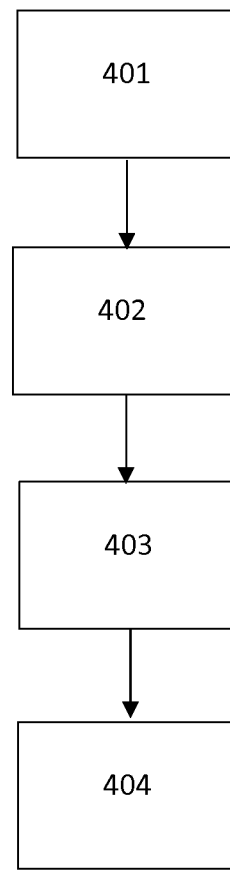
FIG. 17 is a flow chart illustrating aspects of the method according to the present invention.

With reference to FIG. 16, a partial perspective view of another embodiment of the communication device according to the present invention is illustrated. As for the previous embodiments disclosed above, the communication device 300 of FIG. 16 comprises an electrical signal transmission line 118. The first portion 122 of the electrical signal transmission line 118 along its longitudinal extension is connected to at least one electrical component 313, e.g. an audio component, such as a loudspeaker, or a microphone. The electrical component 313 may extend in a ninth plane 317. The electrical component 313 comprises at least one contact surface 312. In FIG. 16, the electrical component 313 includes two contact surfaces 312. The contact surface 312 extends in a tenth plane 314 substantially parallel to the main extension plane 108 of the battery 106 and to the ninth plane 317. The resilient member 136 of the first contact portion 132 of the resilient contact 128 is configured to resiliently abut against the contact surface 312 of the electrical component 313.

With reference to FIG. 17 and FIGS. 4-8, an embodiment of the method for assembling a communication device 102 is now described. The communication device 12 comprises a casing 104 having a back cover 110, a front 140 and a surrounding frame 144. The frame 144 is configured to mount the back cover 110 to the front 140. At least one electrical component 116, e.g. an antenna radiating element 117, is attached to the back cover 110. The method comprises the steps of:

placing 401 a battery 106 inside the frame 144, as illustrated in FIG. 4;

placing 402 a first portion 122 of an electrical signal transmission line 118 alongside the battery 106 between the battery 106 and the frame 144, as illustrated by FIGS. 4 and 5;

connecting 403 a second portion 120 of the electrical signal transmission line 118 to a processing unit 124 of the communication device 102, as illustrated in FIGS. 5-6; and connecting the first portion 122 of the electrical signal transmission line 118 to each of the at least one electrical component 116, wherein the step of connecting the first portion 122 of the electrical signal transmission line 118 to each of the at least one electrical component 116 is effected by attaching 404 the back cover 110 to the frame 144, as illustrated in FIGS. 7-8.

The additional step of placing a processing unit inside the frame may be added, e.g. between the step of placing a battery inside the frame and the step of placing a first portion of an electrical signal transmission line alongside the battery.

The features of the different embodiments disclosed above may be combined in various possible ways providing further advantageous embodiments.

Finally, it should be understood that the invention is not limited to the embodiments described above, but also relates to and incorporates all embodiments within the scope of the appended independent claims.

The invention claimed is:
1. A communication device, comprising:
    a processor;
    at least one electrical component;
    a battery configured to extend in a main extension plane;
    a casing housing the battery and comprising:

a back cover configured to cover the battery, the back cover extending in a plane substantially parallel to the main extension plane;
a front opposite the back cover extending in a plane substantially parallel to the main extension plane;
a surrounding frame configured to mount the back cover to the front wherein the battery is situated inside the surrounding frame and between the front cover and the back cover;
an inner wall between the battery and the surrounding frame and extending alongside the battery in a plane substantially perpendicular to the main extension plane; and
an electrical signal transmission line comprising:
a first portion positioned between the battery and the surrounding frame and coupled to the at least one electrical component along a longitudinal extension of the first portion, wherein the first portion extends alongside the battery in a plane substantially perpendicular to the main extension plane;
a longitudinal stiffener attached to the first portion extending alongside the first portion substantially parallel to the first portion;
a fastener affixing the first portion and the longitudinal stiffener to the inner wall, wherein the fastener comprises electrically conductive material and wherein the first portion is grounded by the fastener; and
a second portion coupled to the processor.

2. The communication device of claim 1, wherein the first portion is coupled to each electrical component by a respective resilient contact coupled to the first portion, wherein each electrical component comprises a contact portion, and wherein the respective resilient contacts are each configured to resiliently abut against a respective contact portion.

3. The communication device of claim 2, further comprising a plurality of resilient contacts, wherein each of the resilient contacts is configured to couple one of the electrical components to the first portion.

4. The communication device of claim 3, wherein the at least one electrical component comprises a plurality of electrical components, and wherein the first portion is configured to couple to the electrical components along the longitudinal extension of the first portion.

5. The communication device of claim 3, wherein each of the resilient contacts comprises a first contact portion and a second contact portion, wherein the first contact portion comprises a resilient member configured to resiliently abut against the contact portion, and wherein the second contact portion is configured to:
couple to the first portion; and
extend in a plane substantially parallel to the first portion.

6. A communication device, comprising:
a processor;
at least one electrical component;
a battery configured to extend in a main extension plane;
a casing housing the battery and comprising:
a back cover configured to cover the battery, the back cover extending in plane substantially parallel to the main extension plane;
a front opposite the back cover extending in a plane substantially parallel to the main extension plane; and
a surrounding frame configured to mount the back cover to the front, wherein the battery is situated inside the surrounding frame and between the front and the back cover;
an inner wall between the battery and the surrounding frame and extending alongside the battery substantially perpendicular to the main extension plane; and
an electrical signal transmission line comprising:
a first portion positioned between the battery and the surrounding frame and coupled to the at least one electrical component along a longitudinal extension of the first portion, wherein the first portion extends alongside the battery substantially perpendicular to the main extension plane;
an electrically conductive longitudinal stiffener attached to the first portion extending alongside the first portion, wherein the first portion is grounded by the longitudinal stiffener;
a fastener affixing the first portion and the longitudinal stiffener to the inner wall; and
a second portion coupled to the processor.

7. The communication device of claim 1, wherein the electrical signal transmission line further comprises a stripline.

8. The communication device of claim 1, wherein the second portion is configured to bend with respect to the first portion to couple to the processor.

9. The communication device of claim 8, wherein the second portion extends in a plane substantially parallel to the main extension plane.

10. The communication device of claim 1, wherein at least one electrical component comprises an antenna radiating element.

11. The communication device of claim 10, wherein the antenna radiating element is configured to attach to the back cover.

12. A method for assembling a communication device comprising a casing having a back cover, a front, and a surrounding frame, the method comprising:
placing a battery inside the surrounding frame, wherein the surrounding frame is configured to mount the back cover to the front, wherein an inner wall is positioned between the battery and the surrounding frame, wherein the back cover is configured to cover the battery, and wherein at least one electrical component is attached to the back cover;
placing a first portion of an electrical signal transmission line alongside the battery between the battery and the surrounding frame;
positioning a longitudinal stiffener adjacent to the first portion;
affixing the first portion and the longitudinal stiffener to the inner wall with a fastener in a configuration whereby the first portion is grounded by at least one of the longitudinal stiffener or the fastener;
coupling a second portion of the electrical signal transmission line to a processor of the communication device; and
coupling the first portion to each of the at least one electrical components by attaching the back cover to the surrounding frame.

13. The method of claim 12, further comprising coupling the first portion to each electrical component using a respective resilient contact.

14. The method of claim 13, wherein the respective resilient contact comprises a plurality of resilient contacts, and wherein the method further comprises coupling an electrical component to the first portion using a corresponding resilient contact.

15. The method of claim 12, wherein the at least one electrical component comprises a plurality of electrical components, and wherein the method further comprises coupling the first portion to the electrical components along a longitudinal extension of the first portion.

16. The method of claim 12, wherein before placing the first portion, the method further comprises placing the processor inside the surrounding frame.

17. The communication device of claim 6, wherein the first portion is coupled to each of the at least one electrical components by a respective resilient contact coupled to the first portion, wherein each of the at least one electrical components comprises a contact portion, and wherein the respective resilient contacts are each configured to resiliently abut against a respective contact portion.

18. The communication device of claim 17, further comprising a plurality of resilient contacts configured to couple one of the at least one electrical components to the first portion.

19. The communication device of claim 18, wherein the at least one electrical component comprises a plurality of electrical components, and wherein the first portion is configured to couple to the electrical components along the longitudinal extension of the first portion.

20. The communication device of claim 18, wherein each of the resilient contacts comprises a first contact portion and a second contact portion, wherein the first contact portion comprises a resilient member configured to resiliently abut against the contact portion, and wherein the second contact portion is configured to:
  couple to the first portion; and
  extend in a plane substantially parallel to the first portion.

* * * * *